United States Patent [19]

Kamiya

[11] Patent Number: 4,949,238
[45] Date of Patent: Aug. 14, 1990

[54] APPARATUS FOR DETECTING MEMORY PROTECTION VIOLATION

[75] Inventor: Shigeo Kamiya, Tokyo, Japan

[73] Assignee: Kabushiki Kaisha Toshiba, Kawasaki, Japan

[21] Appl. No.: 155,085

[22] Filed: Feb. 11, 1988

[30] Foreign Application Priority Data

Feb. 18, 1987 [JP] Japan .................................. 62-33518

[51] Int. Cl.$^5$ ............................................. G06F 12/14
[52] U.S. Cl. ................... 364/200; 364/246.6; 364/261.5; 364/242.8; 364/242.91
[58] Field of Search ... 364/200 MS File, 900 MS File

[56] References Cited

U.S. PATENT DOCUMENTS

| 3,909,802 | 9/1975 | Cassarino, Jr. et al. | 364/200 |
| 4,754,393 | 6/1988 | Kitson et al. | 364/200 |
| 4,763,245 | 8/1988 | Emma et al. | 364/200 |

Primary Examiner—Gareth D. Shaw
Assistant Examiner—Christina M. Eakman
Attorney, Agent, or Firm—Foley & Lardner, Schwartz, Jeffery, Schwaab, Mack, Blumenthal & Evans

[57] ABSTRACT

To detect a memory protection violation at high speed in a data processor for executing microinstructions, plural memory protection information of a descriptor of a new segment program are simultaneously discriminated true or false on the basis of current privilege level and branch condition information of a memory protection branch microinstruction. If discriminated true, the succeeding microinstruction is selected. If false, the current microinstruction is branched to a designated branch address included in the branch microinstruction. The apparatus comprises, an attribute information register for storing plural memory protection information of a new decriptor; a current privilege level register; a privilege level comparator; a microinstruction register for storing a memory protection branch microinstruction including plural branch condition information and a branch address; a memory protection violation detector having AND gates, inverters, and an OR gate; and a read address selector having an adder, etc.

1 Claim, 4 Drawing Sheets

FIG. 4

| | CORRECT ATTRIBUTE DATA | | | | | TRUE MASK FIELD DATA | | | | | | | FALSE MASK FIELD DATA | | | |
|---|---|---|---|---|---|---|---|---|---|---|---|---|---|---|---|---|
| | E | DPL | T | C/D | WE | E | GT | EQ | LT | T | C/D | WE | E | T | C/D | WE |
| INSTRUCTION SEGMENT CHANGE | 1 | DPL=CPL | 1 | 1 | 0 | 0 | 1 | 1 | 1 | 0 | 0 | 1 | 1 | 1 | 1 | 0 |
| STACK DATA SEGMENT CHANGE | 1 | DPL=CPL | 1 | 0 | 1 | 0 | 1 | 0 | 1 | 0 | 1 | 0 | 1 | 1 | 0 | 1 |
| NON-STACK DATA SEGMENT CHANGE | 1 | DPL>CPL | 1 | 0 | * | 0 | 0 | 0 | 1 | 0 | 1 | 0 | 1 | 1 | 0 | 0 |

1: TRUE  0: FALSE

APPARATUS FOR DETECTING MEMORY PROTECTION VIOLATION

BACKGROUND OF THE INVENTION

1. Field of the Invention

The present invention relates to an apparatus for detecting memory protection violations in microprogram controlled data processors.

2. Description of the Prior Art

Computer systems which can implement multiuser-multitask processings on the basis of segmentation have widely been used recently. Here, segmentation means dividing a series of program units into a plurality of united microinstructions so as to be recognized as a single unit during succeeding execution. In these computer systems, it is necessary and important to protect one's own private segment from other people's segments or protect one's own private segments from an error or a mistake in one's own different program.

There are the following memory protection methods: ring protection (privilege protection), write protection, segment type protection, and descriptor enable protection (a descriptor is a word or a phrase used to discriminate a file).

In ring protection (privilege protection), memory is protected by limiting or prohibiting access to a segment with a higher privilege level. In write protection, data writing to code segments is prohibited, and data writing to stack segments (a stack implies an area for temporarily storing data) is always enabled. In segment type protection, descriptors of data segments or other segments are prohibited from being read in a changing instruction segment, for instance. In descriptor enable protection, an invalid descriptor is prohibited from being read.

The above-mentioned memory protection information is stored in a descriptor provided for each segment. Whenever segments are changed in accordance with a program, the corresponding descriptor is read from the memory to check the memory protection information in accordance with a microprogram.

In the above-mentioned prior-art memory protection checking methods, after a descriptor has been read from a memory unit, memory protection information is extracted from the read descriptor one by one in series by a microprogram to compare the information data with a proper value for checking the memory protection violation. In this method, since the checking operations are repeated by the number corresponding to the kinds of memory protection information required to be checked, there exists a problem in that it takes a great deal of time to check a memory protection violation when the kinds of protection information required to be checked increase.

SUMMARY OF THE INVENTION

With these problems in mind, therefore, it is the primary object of the present invention to provide an apparatus for detecting a memory protection violation a higher speed.

To achieve the above-mentioned object, an apparatus for detecting a memory protection violation in a data processor for executing microinstructions under control of microprograms, comprises: (a) first register means for storing memory protection information of a descriptor whenever a segment is changed; (b) second register means for storing a memory protection branch microinstruction including branch condition information corresponding to correct memory protection information; (c) privilege level register means for storing a privilege level of a program now being executed; (d) comparator means for comparing a privilege level information of the memory protection information stored in said first register means with the privilege level stored in said privilege level register; and (e) means for detecting whether correct memory protection information is set to the first register means on the basis of the comparison result, the memory protection information and the branch condition information of the memory protection branch microinstruction.

In the apparatus of the present invention, since it is discriminated whether the memory protection information of a descriptor is correctly stored in an attribute information register, by simultaneously comparing a plurality of memory protection information with the current privilege level and a plurality of branch condition information in a memory protection branch instruction, it is possible to increase the speed of protection violation detection. Further, if the memory protection information of the descriptor is determined to be true, the succeeding microinstruction is normally selected, and if false, the current microinstruction is branched to a designated branch address for appropriate action.

BRIEF DESCRIPTION OF THE DRAWINGS

The features and advantages of the apparatus for detecting memory protection violations according to the present invention will be more clearly appreciated from the following description of the preferred embodiment of the invention taken in conjunction with the accompanying drawings in which:

FIG. 4 is a table listing correct memory protection information and true and false mask fields corresponding thereto.

DETAILED DESCRIPTION OF THE PREFERRED EMBODIMENTS

With reference to the attached drawings, an embodiment of the apparatus according to the present invention will be described hereinbelow.

Figure 1:
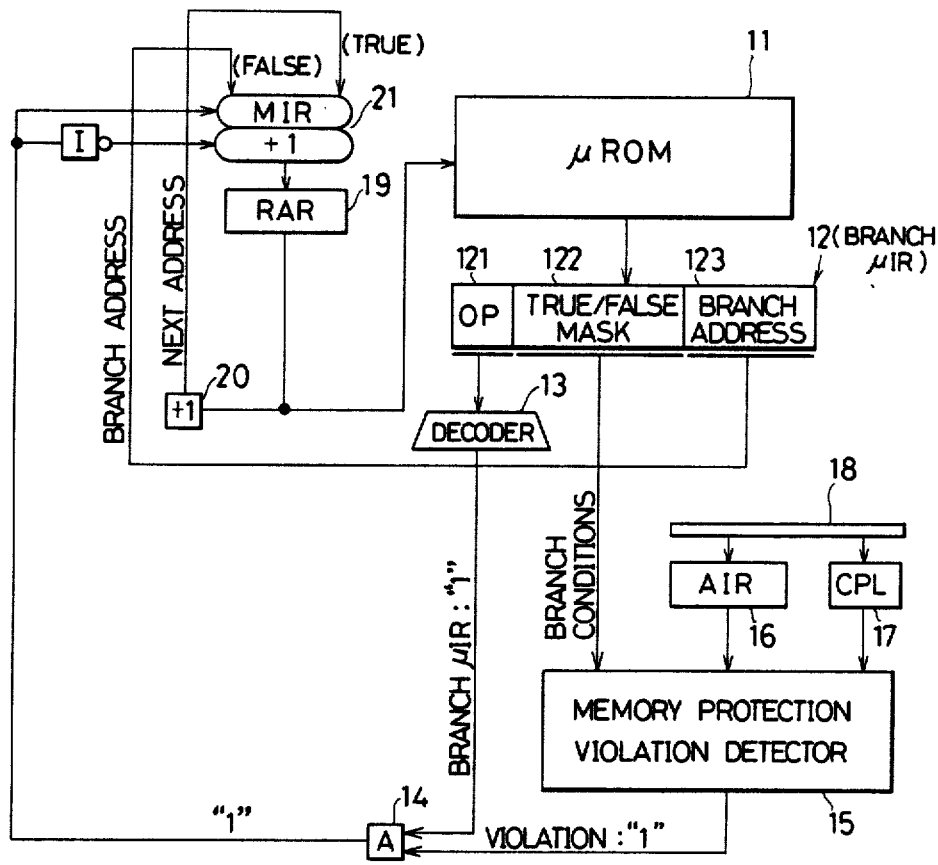
FIG. 1 is a block diagram showing a data processor provided with an apparatus for detecting a memory protection violation according to the present invention.

FIG. 1 is a block diagram of a data processor including an embodiment of the memory protection violation detecting apparatus of the present invention. This data processor implements operations in accordance with microprogram instructions.

In the drawing, the data processor comprises a micro-ROM ($\mu$ROM) 11, a microinstruction register ($\mu$IR) 12, a decoder 13, an AND gate 14, a memory protection violation detector 15, an attribute information register (AIR) 16, a current privilege level register (CPL) 17, a bus 18, a read address register (RAR) 19, an adder 20, and a selector circuit 21.

The $\mu$ROM 11 stores microprograms for executing data processings. Microprograms stored in the $\mu$ROM 11 are read out and then set to the microinstruction register (μIR) 12 in sequence. That is, this μIR 12 stores a memory protection branch microinstruction including a branch address to be branched off to start an appropriate processing (countermeasure) required when a memory protection violation occurs. The μIR 12 includes an operation code register 121 for storing an operation code (OP) of the above-mentioned memory protection branch microinstruction, a true/false mask register 122 for storing a mask true/false branch condition information, and a branched address register for storing the branch address to which the current microinstruction is branched in case of violation.

The operation code register 121 is connected to the decoder 13 for decoding the operation stored in the operation code register 121. When a memory protection branch microinstruction is decoded, this decoder 13 outputs a "1" level signal to the AND gate 14. When other microinstructions are decoded, this decoder 13 outputs a "0" level signal to the AND gate 14.

The mask true/false register 122 is connected to the memory protection violation detector 15, to which the attribute information register (AIR) 16 for storing only memory protection information data from among a descriptor read out of the μROM 11 and a current privilege level register (CPL) 17 for storing a privilege level of a program now being executed are connected. The memory protection information stored in the attribute information register 16 is supplied from a descriptor read from the μROM via the bus 18 whenever the segment is switched. Further, when the privilege level stored in the current privilege level register 17 changes, a new privilege level value is supplied to and set in this current privilege level register 17 via the bus 18.

The memory protection violation detector 15 checks whether the memory protection information stored in the attribute information register 16 is correct or false, on the basis of the memory protection branch microinstruction stored in the mask register 122 of the microinstruction register 12 and the privilege level value stored in the current privilege level register 17, in order to detect a memory protection violation. If a memory protection violation is detected, the detector 15 outputs a "1" level signal to the AND gate 14.

The read address register (RAD) 19 is connected to the μROM 11. Therefore, the μROM 11 reads stored microinstructions in sequence in accordance with addresses supplied from the read address register 19.

The adder 20 connected to the read address register 19 outputs a new address obtained by adding +1 to the current address outputted from the read address register 19.

On the other hand, when a memory protection branch microinstruction is executed and therefore a memory protection violation is detected, an address value stored in the branch address register 123 is set to the read address register 19 via the selector 21, in order to branch the current microinstruction to a new address stored in the read address register 19, so that an appropriate processing (countermeasure) required when a memory protection violation is detected will be executed.

That is, this selector 21 selects an output of the adder 20 or an output of the branch address register 123 in response to an output of the AND gate 14, and the selected output is applied to the read address register 19. In other words, if the output of the AND gate 14 is at "1" because a protection violation occurs, an output of the branch address register 123 is selected. If the output of the AND gate 14 is at "0" because no protection violation occurs, an output of the adder 20 (+1) is selected and supplied to the address register 19.

Figure 2:
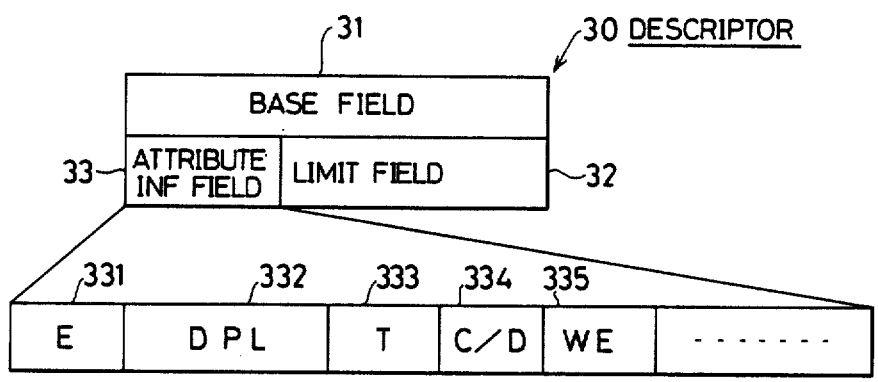
FIG. 2 is a view for assistance in explaining a descriptor.

With reference to FIG. 2, an attribute field stored in the attribute information register 16 and the configuration of a segment descriptor having this attribute field will be described hereinbelow.

FIG. 2 shows the entire configuration of a segment descriptor 30 and the detailed configuration of the attribute field 33 of the segment descriptor 30. The segment descriptor 30 is composed of a base field 31 in which a segment base address is stored, a limit field 32 in which a segment size is stored, and an attribute field 33 in which memory protection information data are stored. The value of the segment size stored in the limit field 32 is one of memory protection information data. However, nothing is described of this limit field 32 herein, because the memory protection violation detector of the present invention will not detect the segment size.

The attribute field comprises an effective (E) field 331 indicative of whether the entire descriptor is valid or invalid; a 2-bit descriptor privilege level (DPL) field 332 indicative of a segment privilege level in the ring protection method; a descriptor type (T) field 333 indicative of the type of the descriptor; a code/data (C/D) field 334 indicative of whether the segment corresponding to the descriptor is a code segment or a data segment; and a write-enable (WE) field 335 indicative of write enable.

Figure 3:
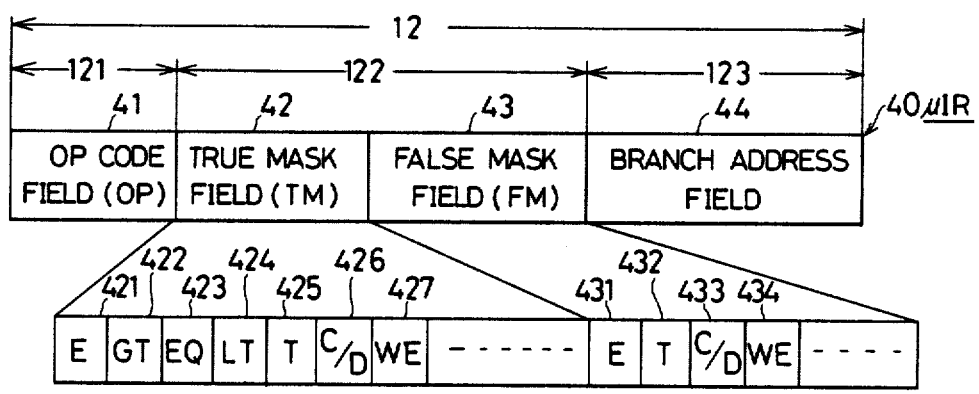
FIG. 3 is a view for assistance in explaining a branch microinstruction for memory protection.

With reference to FIG. 3, the configuration of a memory protection branch microinstruction stored in the microinstruction register 12 will be described hereinbelow. That is, FIG. 3 shows the configuration of the memory protection branch microinstruction and the detailed configurations of the true mask field (TM) and the false mask field (FM) of the memory protection branch microinstruction. In the drawing, a memory protection branch microinstruction 40 is composed of an operation code (OP) field 41, a true mask field (TM) 42 and a false mask (FM) field 43 both indicative of branch conditions, and a branched address field 44.

The true mask field 42 includes a true mask effective (E) field 421, a true mask greater-than (GT) field 422, a true mask equal (EQ) field 423, a true mask less-than (LT) field 424, a true mask descriptor type (T) field 425, a true mask code/data (C/D) field 426 and a true mask write-enable (WE) field 427.

The true mask E field 421 is a mask field indicative of branch conditions corresponding to when the E field 331 is true. If this field 421 is at "1" and further the E field 331 is at "1", the microinstruction is branched irrespective of other branch conditions. The true mask GT field 422 is a mask field indicative of branch conditions corresponding to when the DPL field 332 is greater than the current privilege level register 17 in privilege level. If this field 422 is at "1" and further if the DPL field 332 is greater than the current privilege level register 17 in privilege level, the microinstruction is branched irrespective of other branch conditions. The true mask EQ field 423 is a mask field indicative of branch conditions corresponding to when the DPL field 332 is equal to the current privilege level register 17 in privilege level. If this field 423 is at "1" and further if the DPL field 332 is equal to the privilege level register 17, the microinstruction is branched irrespective of other branch conditions. The true mask LT field 424 is the same as the true mask EQ field 423.

The true T mask field 425 is a mask field indicative of branch conditions corresponding to when the T field 333 is true. If this field 425 is at "1" and further the T field 333 is "1", the microinstruction is branched irrespective of other branch conditions. The true mask C/D field 426 and the true mask WE field 427 are the same as the field 425.

The false mask field 43 is composed of a false mask E field 431, a false mask T field 432, a false mask C/D field 433, and a false mask WE field 434.

The false mask E field 431 is a mask field indicative of branch conditions corresponding to when the E field 331 is false. If this field 431 is at "1" and further the E field 331 is at "1", the microinstruction is branched irrespective of other branch conditions. The false mask T field 432, the false mask C/D field 433 and the false mask WE field 434 are the same as the field 431.

FIG. 4 shows an example of the relationship between correct memory protection information data, true mask field (42) data and false mask field (43) data when a code segment, a stack segment and a non-stack data segment other than the stack segment is changed, respectively.

The change in instruction segment is implemented when a branch instruction (including task change) between two instruction segments is being executed. The branch instruction indicates a JUMP instruction, CALL instruction, RET instruction, etc. The comparison of privilege level, that is, the comparative relationship between the DPL field 323 and the current privilege register 17 is different according to the kind of branch instruction. FIG. 4 shows only the case of a JUMP instruction where the privilege level is not transferred between segments, by way of example. However, cases other than the JUMP instruction can be processed in the same way.

Figure 5:
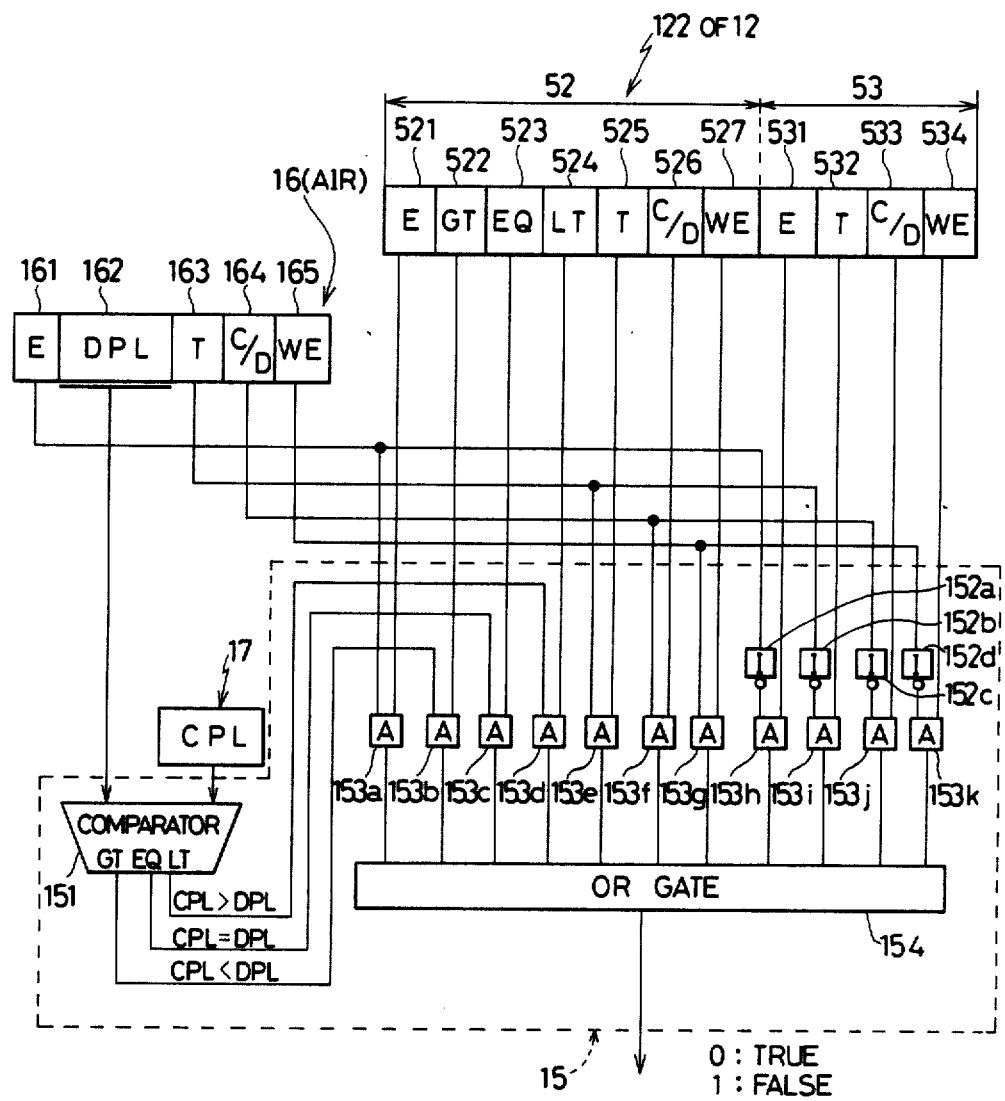
FIG. 5 is a block diagram of the apparatus for detecting a memory protection violation according to the present invention.

FIG. 5 shows a more detailed circuit configuration of the memory protection violation detector 15 shown in FIG. 1 and the true/false mask register 122 of the microinstruction register 12 for storing each field value of the true mask field 42 and the false mask field 43 of a microinstruction µIR shown in FIG. 3, and the attribute register 16 for storing each field value of the attribute field 33 of a descriptor shown in FIG. 2, and the current privilege register 17 for storing a privilege level value of the microinstruction now being executed.

The mask register 122 is composed of the true mask register 52 and the false mask register 53. The true mask register 52 corresponds one to one to the true mask field 42 of the memory protection branch microinstruction 40, and the false mask register 53 corresponds one to one to the false mask field 43 of the memory protection branch microinstruction 40. In more detail, the true mask E register 521 corresponds to the true mask E field 421 of the memory protection branch microinstruction 40 and so on, and the false mask WE register 534 corresponds to the false mask WE field 434 of the memory protection branch microinstruction 40.

Each register 161 to 165 of the attribute register 16 corresponds one to one to each field of the attribute field 33. For instance, the E register 161 corresponds to the E field 331 of the memory protection information.

The memory protection violation detector 15 is composed of a comparator 151, inverter gates 152a to 152d, AND gates 153a to 153k, and an OR gate 154.

The comparator 151 compares the privilege level value stored in the current privilege level register 17 with the value stored in the descriptor privilege level (DPL) register 162. The comparator 151 outputs a "1" level signal from an output LT when the value in the DPL register 162 is lower than that in the CPL register 17, from an output EQ when both are equal to each other and from an output GT when the value in the DPL register 162 is greater than that in the CPL register 17.

The inverters 152a to 152d each provide a logical NOT of the E register 161, the T register 163, the C/D register 164, and the WE register 165 of the attribute register 16, respectively. The output of each of these inverters is supplied to each input of the AND gates 153h to 153k.

The AND gates 153a and 153e to 153g each find a logical AND product of each register 161 to 165 of the attribute register 16 and the E register 521, the T register 525, the C/D register 526, the WE register 527 of the true mask register 52, respectively. Further, the AND gates 153b to 153d find a logical AND product of each output GT, EQ and LT of the comparator 151 and the GT register 522, the EQ register 523 and the LT register 524 of the true mask register 52. Further, the AND gates 153h to 153k each find a logical AND product of the output of each of the inverters 152a to 152d and the E register 531, the T register 532, the C/D register 533 and the WE register 534 of the false mask register 53.

The OR gate 154 finds a logical OR sum of all the outputs of the AND gates 153a to 153k. This OR output is supplied to the AND gate 14 as an output from the memory protection violation detector 15.

[A] The operation of the above embodiment will be described hereinbelow.

Change in code segment.

The assumption is made that a JUMP instruction between two segments (not shown) is executed. A value indicative of a new code segment is first read and a descriptor 30 corresponding to the new code segment is read. To check the presence of a memory protection violation, the descriptor 30 is read from the µROM 11. The attribute field 33 including memory protection information is stored in the attribute information register 16.

In the succeeding step, the memory protection violation of code segment is checked. That is, a memory protection branch microinstruction 40 including mask fields 42 and 43 corresponding to code segments shown in FIG. 4 is executed. In this memory protection branch microinstruction 40 shown in FIG. 4, the true mask E field 421 is "0", the true mask GT field 422 is "1"; the true mask EQ field 423 is "0"; the true mask LT field 424 is "1"; the true mask T field 425 is "0"; the true mask C/D field 426 is "0"; the true mask WE field 427 is "1", the false mask E field 431 is "1"; the false mask T field 432 is "1"; the false mask C/D field 433 is "1"; and the false mask WE field 434 is "0". Therefore, the same data are stored in the microinstruction register 12 as follows: the true mask E register 521 is "0", the true mask GT register 522 is "1"; ...; the false mask WE register 534 is "0".

(1) When correct memory protection information is set to attribute information register 16:

In the attribute information register 16, the E register 161 is "1"; ...; the WE register 165 is "0", as shown in FIG. 4. Further, the value of the DPL register 162 is equal to that of the privilege level register 17. Therefore, the output EQ of the comparator 151 is "1". Therefore, all the AND gates 153a to 153k output a "0" level signal, so that the OR gate 154 outputs a "0" level signal. As a result, the AND gate 14 outputs a "0" level signal to allow the selector 21 to select the output of the adder 20. That is, the result of addition (+1) is set to the address register 19. This indicates a failure of branch operation, so that the microprogram starts processing under the condition that there exists no memory protection violation.

(2) When false memory protection information is set to attribute information register 16:

In the attribute information register 16, the assumption is made that the E register 161 is erroneously "0" and other registers are all correctly set. Therefore, the AND gate 153h outputs a "1" level signal; the other AND gates 153a to 153g, 153i to 153k output a "0" level signal; and the OR gate 154 outputs a "1" level signal. As a result, the AND gate 14 outputs a "1" signal; the selector 21 selects the output of the branched address register 123 to set it to the read address register 19. This indicates an establishment of branch operation, branching to an address of the branched address register 123, so that the microprogram starts necessary processing under the condition that there exists a memory protection violation.

[B] Change in stack segment.

The assumption is made that a segment change instruction is executed (not shown). A value indicative of a new data segment is first read and a descriptor 30 corresponding to a new data segment is read. To check the presence of a memory protection violation, the descriptor 30 is read from the memory. The attribute information field 33 indicative of memory protection information is stored in the attribute information register 16.

In the succeeding step, the memory protection violation of data segment is checked. That is, a memory protection branch microinstruction 40 including mask fields 42 and 43 corresponding to the stack segment shown in FIG. 4 is executed. In this memory protection branch microinstruction 40, as shown in FIG. 4, the true mask E field 421 is "0"; the true mask GT field 422 is "1"; . . . ; the false mask WE field 434 is "1". Therefore, the true mask E register 521 is "0"; the true mask GT register 522 is "1"; . . . ; the false mask WE register 534 is "1".

(1) When correct memory protection information is set to attribute information register 16:

In the attribute information register 16, the E register 161 is "1"; . . . ; the WE register 165 is "1" as shown in FIG. 4.

Further, the value of the DPL register 162 is equal to that of the current privilege level register 17. Therefore, the output EQ of the comparator 151 is "1". Therefore, all the AND gates 153a to 153k output a "0" level signal, so that the OR gate 154 outputs a "0" level signal. As a result, the AND gate 14 outputs a "0" level signal to allow the selector 21 to select the output of the adder 20. That is, the result of addition (+1) is set to the read address register 19. This indicates a failure of branch operation, so that the microprogram starts processing under the condition that there exists no memory protection violation.

(2) When false memory protection information is set to attribute information register 16:

In the attribute information register 16, the assumption is made that the WE register 165 is erroneously "0" and other registers are all correctly set. Therefore, the AND gate 153k outputs a "1" level signal; the AND gates 153a to 153j outputs a "0" level signal; and the OR gate 154 outputs a "1" level signal. As a result, the AND gate 14 outputs a "1" level signal; the selector 21 selects the output of the branch address register 123 to set it to the read address register 19. This indicates an establishment of branch operation, branching to an address of the branched address register 123, so that the microprogram starts processing under the condition that there exists a memory protection violation.

Data segments other than stack segments can be executed in the same way as in the stack segments or code segments, as can be explained with reference to FIG. 4.

As described above, according to the present invention, since a memory protection violation, that is, the fact that memory protection information is true or false can be discriminated on the basis of branch condition information (42, 43) of the memory protection branch microinstruction (40) and a comparison in privilege level between the memory protection information (descriptor privilege level) and program (current privilege level) now being executed, it is possible to simultaneously discriminate whether a plurality of memory protection information of various kinds are correct or not on the basis of a single memory branch microinstruction, thus realizing a high speed memory protection violation.

What is claimed is:

1. An apparatus for detecting a memory protection violation in a data processor for executing microinstructions under control of microprograms, which comprises:

(a) attribute information register means for storing a plurality of memory protection information of a descriptor of a program whenever any one of an instruction segment, a stack segment or a non-stack segment is changed, said memory protection information including data of description validity, descriptor privilege level, descriptor type, code/data discrimination and write-enable;

(b) current privilege level register means for storing a current privilege level of a program now being executed;

(c) comparator means for comparing a descriptor privilege level of said memory protection information stored in said attribute information register means with said current privilege level stored in said current privilege level register means;

(d) microinstruction register means for storing a memory protection branch microinstruction including branch condition information and a branch address;

(e) means for simultaneously discriminating whether said plurality of memory protection information stored in said attribute information register means are correct or not on the basis of the comparison result of said comparator means and said branch condition information stored in said microinstruction register means and for generating a memory protection violation detection signal when not correct;

(f) means for selecting a succeeding microinstruction execution in response to the absence of said memory protection violation detection signal and a microinstruction branch operation in accordance with said branch address stored in said microinstruction register means in response to the presence of said memory protection violation detection signal.

* * * * *